June 20, 1933. L. O. GRANGE 1,914,853
VULCANIZING APPARATUS
Filed May 6, 1929 3 Sheets-Sheet 1
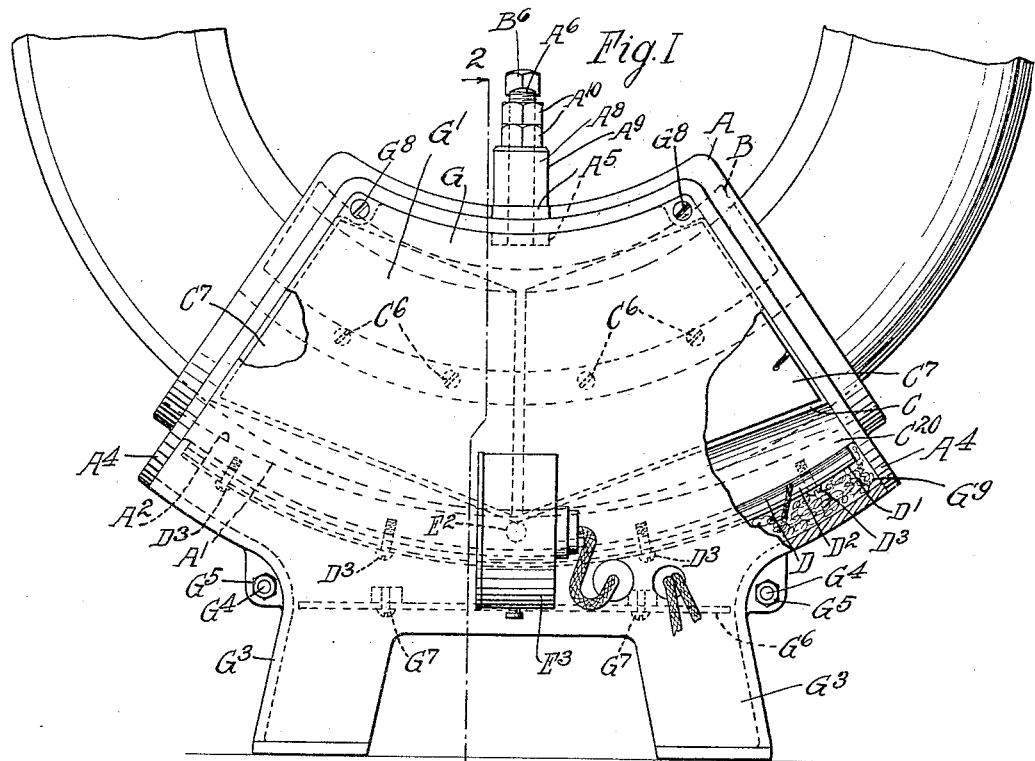
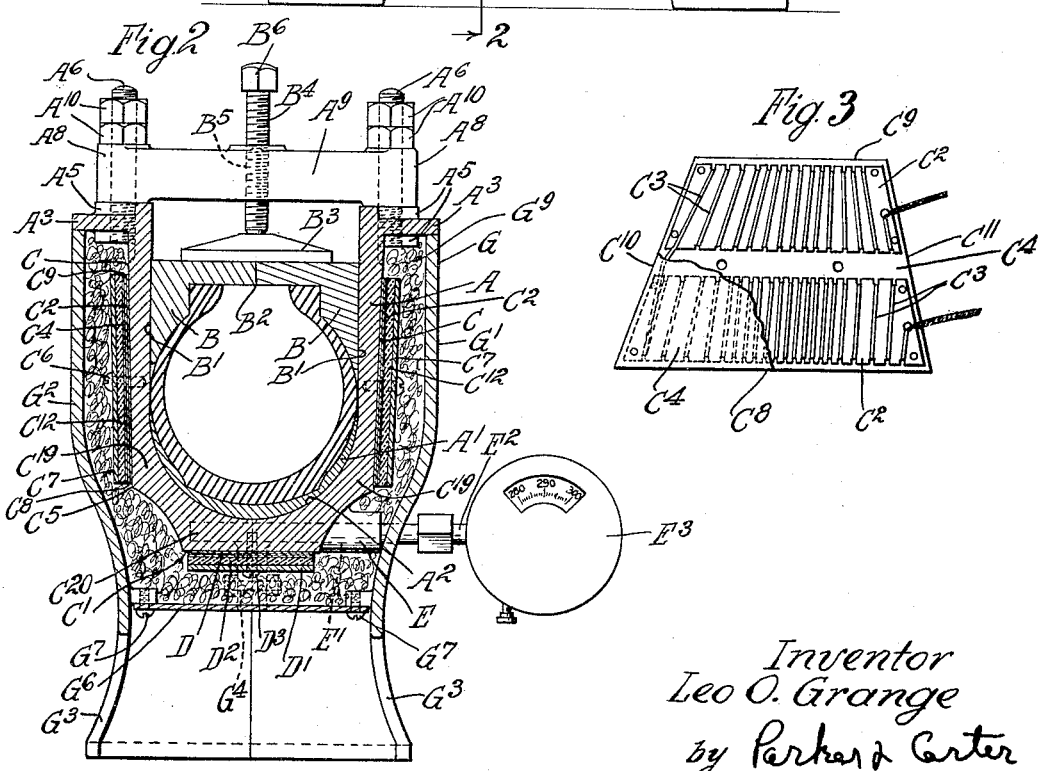
Inventor
Leo O. Grange
by Parker & Carter
Attorneys.

June 20, 1933.  L. O. GRANGE  1,914,853
VULCANIZING APPARATUS
Filed May 6, 1929  3 Sheets-Sheet 2
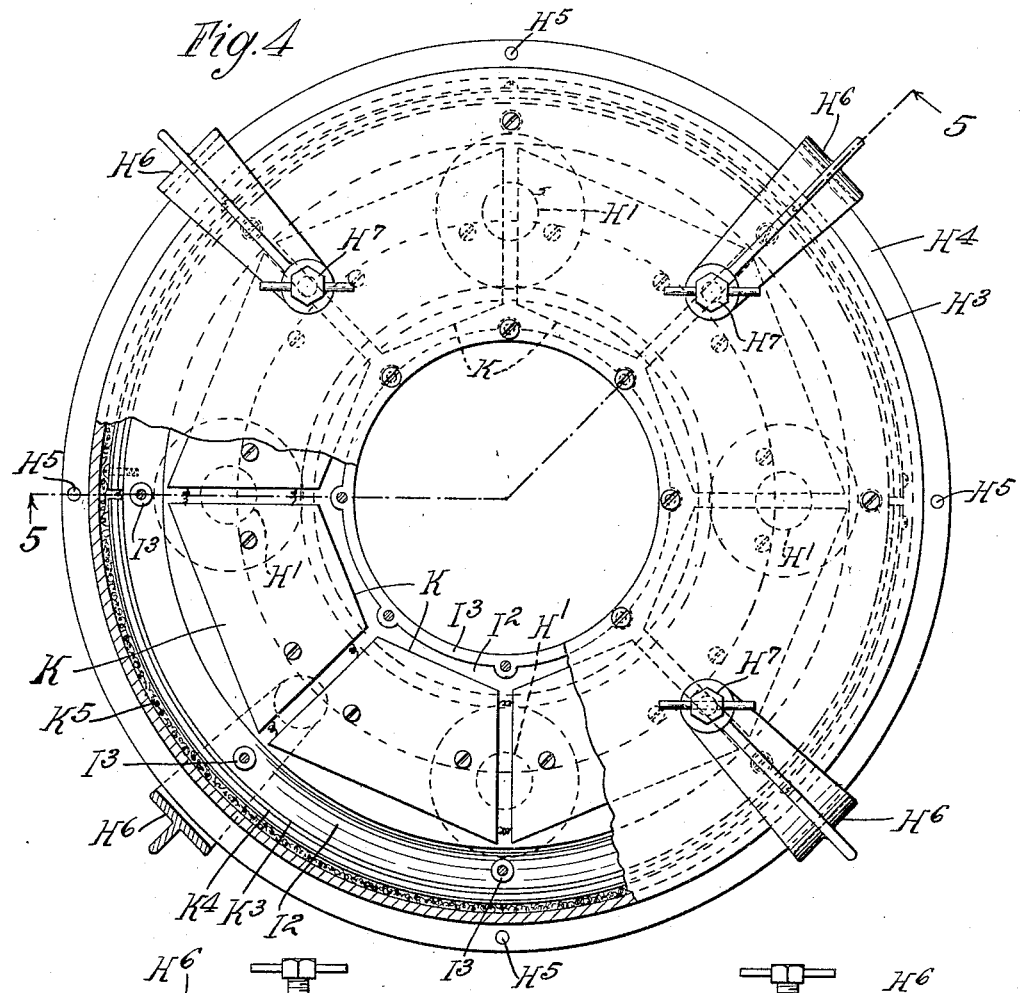
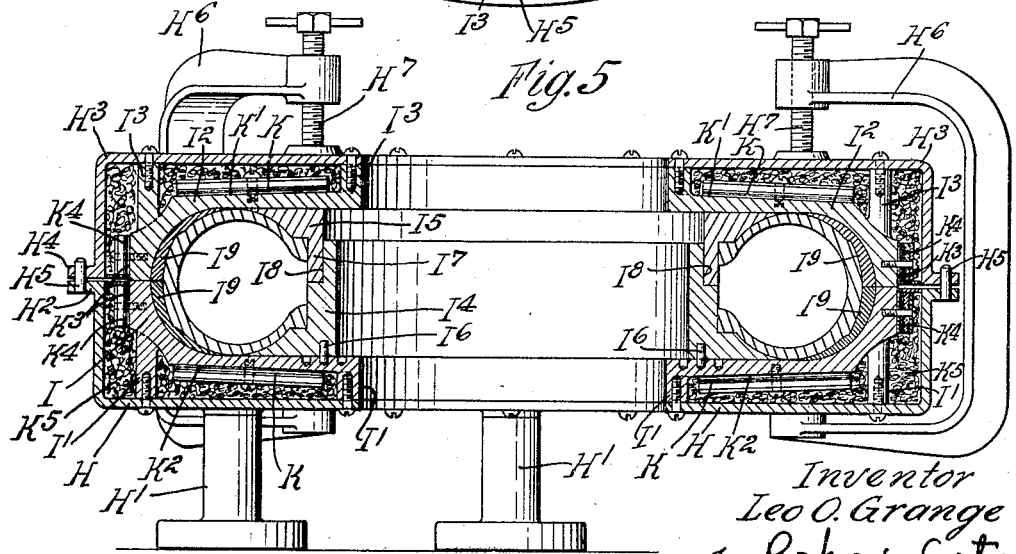
Inventor
Leo O. Grange
by Parker + Carter
Attorneys June 20, 1933.    L. O. GRANGE    1,914,853
VULCANIZING APPARATUS
Filed May 6, 1929    3 Sheets-Sheet 3
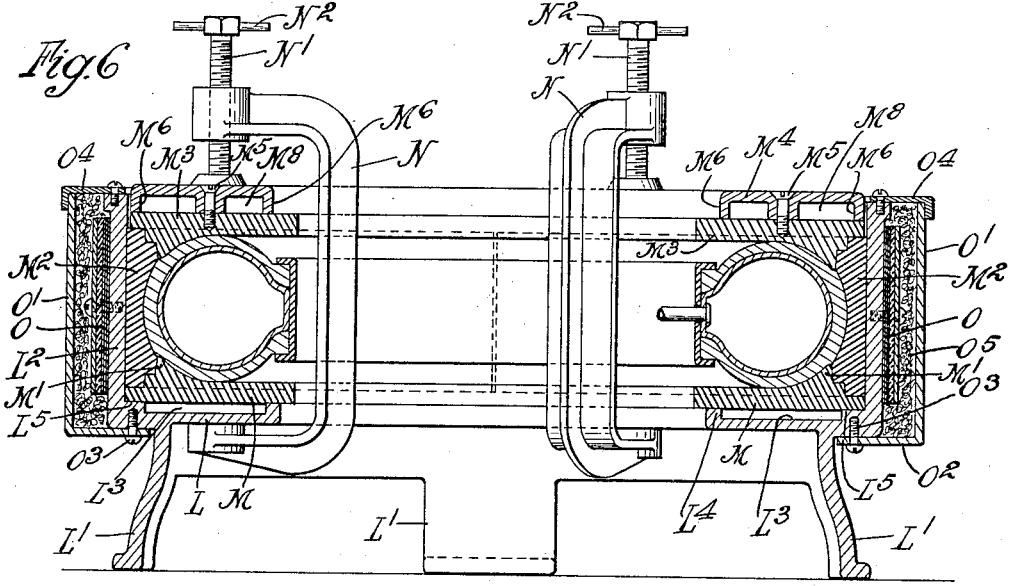
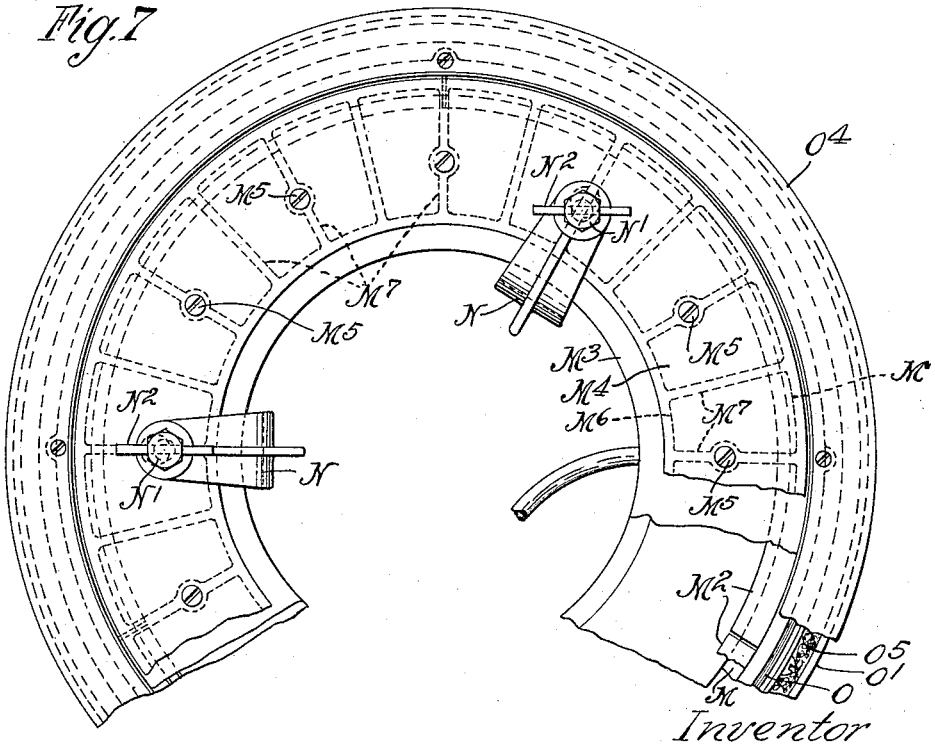
Inventor
Leo O. Grange
by Parker & Carter
Attorneys.

Patented June 20, 1933

1,914,853

UNITED STATES PATENT OFFICE

LEO O. GRANGE, OF CHICAGO, ILLINOIS, ASSIGNOR TO WALTER J. JARRATT, OF CHICAGO, ILLINOIS

VULCANIZING APPARATUS

Application filed May 6, 1929. Serial No. 360,624.

My invention relates to an improvement in vulcanizing apparatus, and particularly to a vulcanizing apparatus adaptable for use in making new tires or in vulcanizing, repairing or retreading old tires. It will also be realized that whereas I have shown my invention as applied to means for operating upon or making tires, it is also susceptible to other uses and may be employed in the treatment or vulcanization of other rubber articles.

Referring to the particular embodiment of my invention herein shown, one object is the provision of means for operating upon or vulcanizing rubber articles in which electricity is employed as a heating means. Another object is the provision of a rubber treating device in which, by variations in the thickness of the shell and by the positioning of the resistance elements and by the spacing of the individual resistance wires or coils, a substantially even or uniform heat is provided throughout the surface of the vulcanizing shell. Another object is the provision of improved means for utilizing the heat so produced with maximum efficiency and a minimum loss by conduction or radiation. Another object is the provision of insulating means for directing the heat into the shell. Another object is the provision of an improved housing means for the vulcanizing installation herein described. Another object is the provision of thermostatic control means whereby a constant heat is applied to the work. Another object is the provision of a shell of such form as to permit the individual resistance elements to be so spaced and positioned upon it as to utilize their heat with maximum efficiency. Another object is the elimination, in such a shell, of highly curved surfaces or sharp angles about which resistance elements have to be bent or deformed. Other objects will appear from time to time in the course of the specification and claims.

I illustrate my invention more or less diagrammatically in the accompanying drawings, wherein Figure 1 is a side elevation of one form of my device;

Figure 2 is a section on the lne 2—2 of Fig. 1;

Figure 3 is a detail of a resistance element;

Figure 4 is a plan view of a variant form of my device adapted for the simultaneous treatment of an entire tire;

Figure 5 is a section on the line 5—5 of Figure 4;

Figure 6 is a section similar to Figure 5, through a variant form of my device;

Figure 7 is a plan view of the structure shown in Figure 6;

Like parts are indicated by like symbols throughout the specification and drawings.

Referring to the form of Figs. 1 and 2, I illustrate a vulcanizer shell generally indicated as A, which conforms generally to the shape of a tire. It will be realized that I might form the inner surface of the shell to conform to the desired shape of tire or tread. I may, however, employ the supplemental tread forming or mold element $A^1$, which rests in the bottom of the trough or slot $A^2$ of the shell A. The shell A is illustrated as having along its upper edges outwardly extending flanges $A^3$. These flanges continue downwardly across the ends of the shell as at $A^4$ $A^4$. Associated with each of the flanges $A^3$ I illustrate a boss or thickening $A^5$ screwthreaded to receive the screw or post $A^6$. Threaded upon the post $A^6$ are the ends $A^8$ of a cross-bar or clamp bar $A^9$. $A^{10}$ indicate any suitable nuts whereby the bar is held in place against the bosses $A^5$.

In order to hold the tire in place, I provide two clamp blocks B B, which have outer faces $B^1$ conforming to the opposed faces of the sides of the channel $A^2$. At their inner edges the blocks B abut, as at $B^2$. An abutment $B^3$ engages the tops of the two clamp members B and is, in turn, engaged by the lower end of the pressure applying screw $B^4$, which is screw-threaded in relation to the bar $A^9$ as at $B^5$. $B^6$ is any suitable head whereby the screw may be rotated in order to direct pressure downwardly against the clamp members B and thus against the tire.

Although the shell A may be formed in a variety of shapes and I do not wish to be limited precisely to the particular form shown, I illustrate, as in Figure 2, a formation of the exterior of the shell which is particularly adaptable for the application thereto of electrical resistance elements. I illustrate, for example, the plane side portions or faces C C and the arcuate peripheral or bottom face $C^1$, which is flat in transverse cross-section as shown in Figure 2. Against these flat or plane faces C C I clamp any suitable resistance elements. I illustrate, for example, herein a resistance element including the core or support $C^2$, two being shown in the form of Figure 3. About these cores or supports is wound the resistance wire $C^3$, preferably flat in cross-section in order that the element may have a minimum thickness. The element may be completed, as, for example, by employment of thin layers of mica or equivalent substance $C^4$ at each side thereof. The unit or heating element so formed may be applied against the plane face C in any suitable manner. I may, for example, taper the shell as at $C^5$ and employ one or more securing screws $C^6$. Any suitable securing plate $C^7$ may be employed, preferably of rigid material, whereby the resistance member is clamped firmly against the face C, throughout the extent of such resistance member. It is important that the resistance member be in immediate proximity to and in contact with the opposed face of the shell, that the passage of heat from the resistance wires may be as direct as possible and with as little loss as possible. Surfaces C are so proportioned that, as shown in Figure 1, I may employ two resistance elements, each such element being at its edges by the parallel edges $C^8$ $C^9$ and the inclined edges or ends $C^{10}$ $C^{11}$. $C^{12}$ indicates a sheet of heat insulating material positioned between the holding plate $C^7$ and the heating element which may be held in position, for example, by the action of the screws $C^6$. I do not wish to be limited to any specific shape of element, but the one shown is satisfactory and is well adapted for the covering of the face C when it is shaped as shown in Figure 1.

I may oppose to the arcuate surface $C^1$ one or more resistance elements, generally indicated as D, which are generally like the resistance element above described. In such case $D^1$ is the securing sheet or member and $D^2$ an interposed insulating sheet, the assembly so formed being secured in place by the screws $D^3$.

I do not herein illustrate the electric circuits employed, since they do not per se form part of the present invention. I employ, however, a thermostatic means responsive to the temperature of the shell. I prefer to have this means respond to the temperature of the shell adjacent the inner face of the shell. I employ, for example, the enlargement E in the bottom of the shell, which is apertured as at $E^1$. Penetrating such aperture is the tube or conduit $E^2$, within which may be positioned any suitable thermostatic member whereby the circuit of the resistance elements is broken in response to increase in temperature above a predetermined maximum, and is closed again in response to a drop in temperature below a predetermined minimum. $E^3$ diagrammatically indicates any suitable indicating mechanism associated with the thermostatic element.

Positioned about and supporting the shell A is a housing structure, generally indicated as G. It may include, for example, the two abutting side portions $G^1$ and $G^2$, which are formed with the feet $G^3$ and may be secured together by any suitable means, as the bolts $G^4$ and the nuts $G^5$. The bottom of the housing so formed being open, I may employ any suitable closing plate $G^6$, held in position, for example, by screws $G^7$. $G^8$ indicate securing screws whereby the sides of the members $G^1$ $G^2$ may be screwed directly to the shell adjacent its upper corners. The space within the housing, so formed, may be filled with any suitable insulting material $G^9$, whereby the escape of the heat from the resistance elements, except to and through the shell A, is further limited.

Referring to the form of Figures 4 and 5 I have applied a structure substantially equivalent to that of Figures 1 and 2 to a device for treating simultaneously an entire tire. I may employ for example the lower housing member H supported upon any suitable bases or supports $H^1$ and provided with a circumferential flange $H^2$. $H^3$ indicates a corresponding upper housing member with a flange $H^4$, the housing members being aligned for example by the pins $H^5$. $H^6$ indicate any suitable clamp frames with the clamping screws $H^7$, whereby the two housing members are thrust together to provide the necessary pressure. Formed within the lower housing member is the lower shell member I which may be supported for example by the supporting and spacing flanges and lugs $I^1$. $I^2$ is the corresponding upper shell member with its supporting spacing flanges and lugs $I^3$. In order to conform the shell to the tire I may provide the lower form member $I^4$ and the upper form member $I^5$ mating with it. The form member $I^4$ may be positioned in relation to the shell I, as by the pins $I^6$ and the lower flange $I^7$ of the upper form member $I^5$, seating in a recess $I^8$ in the lower form member, is positioned thereby. $I^9$ $I^9$ indicate any suitable tread forms which may be positioned within the shells I $I^2$, when the shells are not actually formed to the desired form or contour of the tire.

It will be understood, from Figure 5, that the flanges H², H⁴ of the two housing members are spaced slightly apart, so that the clamping action of the clamps will be effective to thrust the shells into absolute contact.

A plurality of heating elements K are secured to the flat top and bottom portions K¹ K² of the upper and lower shells respectively. These resistance members may be the same, in detail, as those shown in Figures 2 and 3. The shells, when brought together are formed with an arcuate or rather cylindrical peripheral surface generally indicated as K³, to which are opposed the arcuate resistance elements K⁴ K⁴ corresponding with the element or elements indicated as D in Figures 1 and 2. The space between the shells and the upper and lower housing members is filled with any suitable insulating material K⁵.

Stated generally, the characteristics of the form of Figures 4 and 5 are the same as those of Figures 1 and 2, save for the changes made necessary by the application of the device to a complete circle for the simultaneous treatment of the entire periphery of the tire.

Referring to the form of Figures 6 and 7 I may employ a base member L with a plurality of supporting feet L¹ and an upwardly projecting generally cylindrical circumferential flange L². The member L is recessed as at L³, the recess being bounded by a central peripheral flange L⁴ and a supporting ledge L⁵. Positioned upon said flange and ledge is the supporting and forming ring M provided with the upward extension of flange M¹ conforming to the portion of the tire. M² indicates a circumferential form which may be formed as a complete ring or as a plurality of segments and M³ is an upper form member corresponding to the member M. It will be seen, from Figure 6, that the members M, M², M³, taken together, provide a form or shell conforming to the exterior of the tire to be treated. If desired a supplemental inner shell or form, such as I⁹ of Figure 5, might be employed. M⁴ indicates a clamp engaging member which may be secured as by the screws M⁵ to the form M³. It is spaced from the upper surface of the member M³ as by the circumferential inner and outer flanges M⁶ and the radial flanges M⁷, there being thus formed intermediate heat insulating air pockets M⁸ corresponding to the pocket formed by the recess L³. In order to hold the whole assembly together when a tire has been positioned I may employ the clamp bodies N with the clamping screws N¹ and the handle members N². It will be observed, from Figure 6, that this form of my device is adapted for the treatment of a tire positioned on a rim or wheel, since the members M, M², M³ engage only the tread and sides of the tire and not the entire tire or casing. Since this form, as shown, is particularly adaptable for re-treading tires I may apply heat only about the circumference of the tread. I thus indicate arcuate heating or resistance heating elements O, one or more of which may be employed to surround the entire exterior of the cylindrical flange L². This peripheral heating element O is contained within a housing O¹ the lower flange O² of which may be bolted as at O³ to the member L. It is completed by the cover member O⁴. The space between the resistance member O and the housing may be filled by any suitable insulating material O⁵.

The use and operation of my invention are as follows:

In the form of Figs. 1 and 2 I have illustrated an application of my invention to the retreading or vulcanizing or mending of tires, wherein the tire is engaged about a relatively small arc. In the form of Figs. 4 and following, I have illustrated a further form in which my invention is applied to a device capable of receiving an entire tire. It will thus be seen that I may employ "dry" heat or may employ my particular heating means, not only for vulcanizing a part of the tire but for vulcanizing an entire tread at once, or for manufacturing a new tire.

In order to vulcanize rubber, whether in operating upon a tire or upon some other object, or whether in operating a part of a tire or an entire tire, I find it highly important to maintain an even heat; that is to say, the heat delivered by any portion of the vulcanizing shell should be substantially uniform, and the heat delivered by the shell as a whole should be constant. In order to maintain a constant heat, I employ the thermostatic control means illustrated, whereby, when the temperature of the shell drops below a predetermined minimum, all the resistance elements are actuated. When the temperature rises again to exceed a predetermined maximum, the resistance elements are all, in turn, cut out. I find this to be a simple and efficient method of control, particularly where I employ a shell of sufficient thickness or mass to be a good holder or reservoir of heat. I do not wish to be limited, however, except as precisely set out in the claims, to the use of this particular regulatory arrangement. Equally important is the uniform or even delivery of heat throughout the inner surface of the shell.

In employing the electric resistance elements I have had to solve a number of more or less difficult problems. Were I to employ a plane vulcanizing surface of generally constant thickness having generally evenly spaced or uniformly operative resistance elements placed against it, there would be a concentration or building up of heat at the central portion of the plate and it would be necessary to distribute the resistance elements or the individual resistance wires more or less irregularly about its surface, they being more thickly spaced about the edge of the plate and more sparcely placed toward the center of the plate. In dealing with the far more complicated form of a shell adapted for vulcanizing or for making tires, the problem of obtaining a proper distribution of heat becomes more difficult. By varying the thickness of the shell and by increasing the thickness of the shell at points where it is difficult to place a heating element, I obtain a building up of heat in parts of the shell which are not actually contracted by the heating elements.

Referring, for example, to Fig. 2, note that the bottom of the shell is thicker than the sides, and note also that the flattening or building out of the surfaces C and $C^1$ develops thickened portions in the shell, which I indicate as $C^{19}$ and $C^{20}$. These thickened portions are adjacent part of the shell where it is impracticable to position a resistance element of the type shown in Figs. 2 and 3. However, the thickened portions $C^{19}$ and $C^{20}$, being adjacent the edges of the resistance elements opposed to the plane surfaces, receive heat from them. The thickened portions and the relatively thick shells proportioned between them serve to conduct the heat received from the resistance elements to the intermediate portion of the shell, and once the shell is thoroughly heated ready for operation the heat is delivered as satisfactorily there as elsewhere in the shell. Thus I obtain a uniform distribution of heat, although the thickness of the shell varies and although parts of the shell are not subjected to the direct action of the heating means at all. Furthermore, I find it desirable to vary the spacing of the winding on the individual resistance elements. Such variation in winding is more or less diagrammatically illustrated in Figure 3, which conforms to the element employed on one of the devices I have actually built. In some of my devices I prefer to have the resistance wire wound close about each end of the heating elements.

Since it is the temperature of the inner surface of the shell which is of particular importance, I position my thermostatic control means, or the heated responsive portion thereof, as closely as possible to the inner face of the shell. This is clear from Figure 2, where the tube $E^2$ is shown as extending very close to the inner surface of the member A.

I am able to space my resistance elements apart on the shell, and to rely upon conduct of heat through the shell, to a considerable extent because of my employment of the outer housing G and its filling of insulating material $G^9$. I might dispense with the outer housing G and provide other means for holding the insulation $G^9$ in place, but the arrangement shown is thoroughly practical and has given satisfaction in use.

Referring to the form of Figures 4 and 5 I have applied to the complete circumference of a tire or casing shells and heating elements corresponding to those shown in Figures 1 and 2. The upper and lower heating elements K may be substantially the same in form as the element shown in Figure 3 and the peripheral arcuate heating elements $K^4$ correspond to the elements D of Figures 1 and 2. I have not illustrated in Figures 4 and 5 a thermostatic device since it will be understood, as shown in Figures 1 and 2, that any suitable thermostatic control may be employed. In employing the device of Figures 4 and 5 the casing is positioned within a lower shell, the upper shell is positioned on it, the form members $I^4$ $I^5$ being first put in place. Then the clamps are tightened and the device is ready for use.

Referring to the form of Figures 6 and 7 I provide a retreader in which the tire as a whole, while positioned on a rim or wheel and inflated, may be treated. The tire rests on the lower form member M and the upper form member $M^3$ is positioned on it. The air pockets $L^3$ and $M^8$ serve to conserve the heat which is delivered from the heating member O direct through the flange $L^2$ and the frame member $M^2$ to the tread.

As to the forms of my device shown in Figures 1 to 6 inclusive, note that in each case a resistance heating element is tightly secured to the exterior surface of a metal element which is in intimate contact with the tire being treated, or which actually engages and conforms to whatever intermediate form is employed. Thus, referring to Figure 6, the heat delivered by the resistance element O passes through the flange $L^2$ and the form $M^2$ to the tread.

To a considerable extent the members M and $M^3$ are also heated. The escape of heat therefrom is substantially reduced by the air pockets $L^3$ and $M^8$. In the form of Figures 1 to 5, where a relatively even heat is delivered to the entire casing the lateral heating elements, above described, are employed. In the form of all these figures the heating elements, which are secured directly to and in close contact with the surrounding shells or forms, are insulated by surrounding housings, the space between the resistance elements and the housing walls being filled with insulating material.

It will be realized that whereas I have described and shown a practical and operative device and several embodiments of my invention, I do not wish to be limited specifically to any specific structure herein described or illustrated. In fact I wish my description and drawings to be taken as in a broad sense illustrative and diagrammatic, rather than as limiting me to any particular structure except to the extent that I limit myself to the language of my claims.

I claim:

1. The combination in a tire vulcanizing mold construction of a mold member having a cavity formed therein of the shape of a tire, and having flat faces at the sides of said cavity opposite the side walls of a tire to be cured therein and a peripheral transversely flat face opposite the tread of a tire cured therein, electrical heating elements of flexible sheet-like form arranged against said side faces and said peripheral face, and means for pressing said heating elements against said faces, said pressing means comprising flat pressure plates for the side faces and a longitudinally curved transversely flat pressure plate for the peripheral face, and means for clamping said pressure plates against said heating elements to apply pressure substantially over the entire areas of the heating elements flexing said heating element into intimate contact with said faces.

2. The combination in a tire vulcanizing mold of a mold member having an inner surface shaped to the contour of the tread portion of the tire and an outer peripheral face which is transversely flat opposite said surface, an electrical heating element of flexible sheet-like form arranged against said face, and pressing means comprising a pressure plate of longitudinally curved and transversely flat formation for pressing said heating element into intimate contact with said outer peripheral face by engagement over substantially the entire area of said heating element flexing said heating element into intimate contact with said face.

Signed at Chicago county of Cook and State of Illinois, this 2nd day of May, 1929.

LEO O. GRANGE.